United States Patent
Vollkommer et al.

[11] Patent Number: 6,157,145
[45] Date of Patent: Dec. 5, 2000

[54] METHOD OF OPERATING A DISCHARGE LAMP WITH A COLD CATHODE STRUCTURE HAVING FERROELECTRIC BETWEEN

[75] Inventors: Frank Vollkommer, Buchendorf; Lothar Hitzschke, Munich, both of Germany

[73] Assignee: Patent-Treuhand-Gesellschaft fuer elektrische Gluenlampen mbH, Munich, Germany

[21] Appl. No.: 09/117,441

[22] PCT Filed: Dec. 10, 1997

[86] PCT No.: PCT/DE97/02881

§ 371 Date: Jul. 30, 1998

§ 102(e) Date: Jul. 30, 1998

[87] PCT Pub. No.: WO98/26447

PCT Pub. Date: Jun. 18, 1998

[30] Foreign Application Priority Data

Dec. 11, 1996 [DE] Germany ............ 196 51 552

[51] Int. Cl.[7] .................................................. H01J 11/04
[52] U.S. Cl. ..................... 315/339; 315/334; 315/336
[58] Field of Search ..................... 313/491, 518, 313/631, 346 R; 315/169.3, 169.4, 246, 291, 326, 334, 339

[56] References Cited

U.S. PATENT DOCUMENTS

| | | |
|---|---|---|
| 3,811,062 | 5/1974 | Andoh et al. . |
| 5,159,238 | 10/1992 | Koiwa et al. . |
| 5,418,424 | 5/1995 | Aprile et al. . |
| 5,508,590 | 4/1996 | Sampayan et al. ............ 313/346 |
| 5,631,664 | 5/1997 | Adachi et al. . |
| 5,773,930 | 6/1998 | Ahn ........................... 313/506 |

FOREIGN PATENT DOCUMENTS

| | | |
|---|---|---|
| 0428853 | 5/1991 | European Pat. Off. . |
| 0675520 | 10/1995 | European Pat. Off. . |
| 0700074 | 3/1996 | European Pat. Off. . |
| 4311197 | 10/1994 | Germany . |
| 29501343 U | 6/1995 | Germany . |
| 19517515 | 11/1996 | Germany . |
| 06103886 | 4/1994 | Japan . |

(List continued on next page.)

OTHER PUBLICATIONS

Patent Abstracts of Japan vol. 097, No. 002, Feb. 28, 1997 & JP 08 262996 A (Olympus Optical Co. Ltd.), Oct. 11, 1996.

Patent Abstracts of Japan vol. 095, No. 001, Feb. 28, 1995 & JP06 283092 A (Olympus Optical Co. Ltd.), Oct. 7, 1994.

Patent Abstracts of Japan vol. 018, No. 077 (E–1504), Feb. 8, 1994 & JP 05 290811 A (Matsushita Electron Corp), Nov. 5, 1993.

Robert C. Miller and Albert Savage, "Motion of 180° Domain Walls in Metal Electroded Barium Titanate Crystals as a Function of Electric Field and Sample Thickness", Journal of Applied Physics vol. 31, No. 4, Apr. 1960, pp. 662–669.

(List continued on next page.)

*Primary Examiner*—Vip Patel
*Attorney, Agent, or Firm*—Carlo S. Bessone

[57] ABSTRACT

A method of operating cold cathode in discharge lamps, including discharge lamps operating with a dielectrically hindered discharge that include two electroconducive electrodes facing each other between which a ferro-electric material is sandwiched. At least one of the electrodes presents one or more openings. When the cathode is operating, a voltage of quickly alternating polarity is applied to both electrodes, thereby freeing electrons on the surface of the ferro-electric material. The working voltage of the discharge lamp causes an acceleration of said electrons, which pass through the openings towards the anode and are used for igniting the discharge lamp and keeping it in an operating mode.

6 Claims, 3 Drawing Sheets

FOREIGN PATENT DOCUMENTS

| | | |
|---|---|---|
| 8264104 | 10/1996 | Japan . |
| 8264105 | 10/1996 | Japan . |
| 8315724 | 11/1996 | Japan . |
| 9423442 | 10/1994 | WIPO . |

OTHER PUBLICATIONS

Puchkarev, Victor F., "On the mechanism of emission from the ferroelectric ceramic cathode", J. Appl. Phys., vol. 78, No. 9, Nov. 1, 1995, pp. 5633–5637.

Jiang, B. et al., "High brightness electron beam produced by a ferroelectric cathode", Appl. Phys. Lett., vol. 66, No. 10, Mar. 6, 1995, pp. 1196–1198.

Sampayan, S.E. et al., "Emission from ferroelectric cathodes" Nucl. Instr. and Meth. in Phys. REs. A. vol. 340, 1994 pp. 90–05.

Schachter, L. et. al., "Analysis of a diode with a ferroelectric cathode", J. Appl. Phys., vol. 73, No. 12, Jun. 1993, pp. 8097–8110.

Gundel H. et. al., "Low–Pressure hollow cathode switch triggered by a pulsed electron beam emitted from ferroelectronics", Applied Physics Letters, vol. 54, No. 21, May 22, 1989, pp. 2071–2073.

METHOD OF OPERATING A DISCHARGE LAMP WITH A COLD CATHODE STRUCTURE HAVING FERROELECTRIC BETWEEN

BACKGROUND OF THE INVENTION

The invention relates to a cold cathode for discharge lamps, in particular for discharge lamps which are discharge.

In dielectrically impeded discharges, at least one electrode is separated from the discharge space by a dielectric layer.

The invention also relates to a discharge lamp having this cold cathode, in particular to a discharge lamp which is operated by means of a dielectrically impeded discharge, as well as to a method for operating such lamps.

Here, the term "discharge lamp" signifies radiators which emit light, that is to say visible electromagnetic radiation, or else ultraviolet (UV) and vacuum ultraviolet (VUV) radiation.

The task of the electrodes of discharge lamps is, inter alia, to supply the number of free electrons necessary for maintaining a self-maintained discharge. These electrons are essentially supplied by the cathode (in the case of operation with a voltage of invariable polarity, for example DC voltage or unipolar pulsed voltage) or by the instantaneous cathode (in the case of operation with a voltage of variable polarity, for example AC voltage or bipolar pulsed voltage). Furthermore, free electrons are generated in the cathode fall space positioned in front of the (instantaneous) cathode.

The cathode fall space is characterized by a field strength which is high by comparison with the remaining space between the electrodes, that is to say the electric potential with respect to the cathode drops relatively strongly in this region. Consequently, a generation of free electrons in the cathode fall space is linked in general to a correspondingly high power turnover. With regard to as efficient as possible a generation of useful radiation, that is to say of light or UV/VUV radiation, the aim is to reduce the cathode fall of discharge lamps. In the final analysis, this requires increasing the efficiency with which electrons emerge from the cathode surface.

One possibility consists in designing the electrodes as filaments, heating them and, if appropriate, additionally coating them with an emitter paste, in order thereby to improve the thermal electron emission. This relatively complicated technique is applied, for example, in the case of fluorescent lamps. Further disadvantages associated with these so-called hot electrodes are the limited service life of the lamp and the heating up of the filling gas.

DE-U 295 01 343 discloses a glow fluorescent lamp having a cold cathode. The electrodes are doped with manganese or lanthanum in order to reduce the cathode fall.

U.S. Pat. No. 5,418,424 describes a VUV radiation source having a photocathode. Formed inside the radiation source, inter alia, are Xe excimers which generate shortwave VUV radiation. The photocathode comprises a 50 nm thick photoemitting layer, applied to a stainless steel surface, and a grid electrode in parallel with said layer. The VUV radiation passes through the grid electrode onto the photoemitting layer and releases electrons there by means of the photo effect. These electrons then pass through the grid electrode and thus maintain the discharge. A disadvantage is that the described mechanism for generating electrons is based on the VUV radiation generated by the discharge itself. Thus, during ignition of the discharge, this electron source is not yet available, or is so only to a limited extent. This can be seen in a negative fashion in a loss of efficiency in the case of discharges operated in pulses.

EP 675 520 A2 discloses a pot-shaped or beaker-shaped electrode for miniature neon lamps for automobile illumination. The inner wall of the electrode is uniformly covered with an emitter layer.

Finally, U.S. Pat. No. 5,159,238 describes a cathode for flat discharge lamps. The cathode comprises electrically conductive oxide particles which are embedded in a low-melting glass, for example lead glass.

SUMMARY OF THE INVENTION

It is the object of the invention to remove the said disadvantages, and to specify an electrode having improved electron emission properties at a low electrode temperature.

A further object of the invention is to specify a discharge lamp which contains the said cathode.

Finally, it is a further object of the invention to specify a method for operating such a discharge lamp.

The basic idea of the invention consists in making use of the capacity, demonstrated by R. Miller and S. Savage, of ferroelectric materials to emit electrons (R. Miller and S. Savage, Journal of Applied Physics 21, 1960, page 662ff), specifically for a cold cathode having improved electron emission properties. The mechanism of electron release is based, as is known, on a rapid reversal of polarity inside the ferroelectric.

The invention proposes a cold cathode having a sandwich-type design. In this arrangement, a ferroelectric material, for example a ceramic made from lead zirconium titanate (PZT) or lead lanthanum zirconium titanate (PLZT) is arranged between two electrically conductive surfaces, realized by plates, foils, films or similar, for example. One or both surfaces have at least one or more openings, for example in the form of a perforated plate, wire grid or an appropriate applied layer. The ferroelectric material is uncovered at the sites of the openings, so that the free electrons generated by the ferroelectric can pass through these openings in the direction of the anode of the discharge device. The sandwich-type cold cathode according to the invention will also be termed a sandwich cathode below for the sake of brevity.

During operation in a discharge lamp, a sequence of rapidly alternating voltage pulses is applied to the two electrically conductive surfaces. The sandwich cathode therefore acts like an electric capacitor, the surfaces corresponding to the capacitor electrodes. In this scenario, the ferroelectric plays the role of the capacitor dielectric. The rapid polarity reversal inside the ferroelectric which was outlined at the beginning is achieved in this way.

It is preferred for the sandwich cathode and, in particular, the ferroelectric layer to be of thin design in order to keep as low as possible the level of the voltage pulses which is required for the polarity reversal. Typical values for the thickness of the layer are less than 1 mm, values in the region of approximately 10 $\mu$m and 0.2 mm being preferred.

The sandwich cathode can be used with various types of cold cathode discharge lamps. The cold cathode according to the invention develops its advantageous effect independently of whether the anode has a dielectric impediment or not. The only decisive factor in this regard is that the sandwich cathode itself is located inside the discharge vessel without a dielectric impediment. The geometry of the sandwich cathode is adapted in this case as optimally as possible to the geometry of the discharge vessel.

The sandwich cathode is shaped as a hollow cylinder for tubular discharge lamps, for example like the glow fluorescent lamp, mentioned at the beginning, of DE-U 295 01 343, or like the glow fluorescent lamp disclosed in EP 700 074. The metal inner and outer walls of the sandwich cathode each have a leading-in wire. The two leading-in wires are led to the outside from the discharge vessel in a gastight fashion. It is thereby possible to lead the rapidly alternating voltage pulses to the sandwich cathode.

Advantageous use is likewise made of the sandwich cathode in a discharge lamp which is operated by means of a discharge impeded dielectrically on one side. The sandwich cathode is arranged in the interior of the discharge vessel, for example by being applied directly to the inner wall. The anode is either fitted on the outer wall or in the interior of the discharge vessel. In the latter case, the anode is, however, separated from the actual discharge by an additional dielectric, for example a thin glass layer.

One advantage of the sandwich cathode consists in the precise controllability of the instant of release of the electrons. Specifically, the efficiency of the generation of useable radiation can be increased by the temporal tuning of the voltage signals for the rapid polarity reversal or the discharge. This holds, in particular, for the pulsed discharge in accordance with WO 94/23442, which is already distinguished in any case by improved efficiency of the useable radiation. The increase in efficiency is achieved by the specific provision of an adequate number of electrons on the surface of the sandwich cathode immediately before the ignition of the gas discharge.

The increase in efficiency by the use of a sandwich cathode according to the invention is, of course, limited for the AC voltage excitation likewise used in the case of dielectrically impeded discharges, since here the sandwich cathode acts as an anode in each second phase, and consequently the electrons released there do not contribute to the discharge.

The operating method according to the invention appears as follows in the case of a dielectrically impeded discharge operated in pulses. Firstly, a voltage signal of rapidly reversing polarity is applied to the two electric terminals of the sandwich cathode. As soon as a sufficient number of electrons have been released on the surface of the sandwich cathode owing to the rapid polarity reversal of the ferroelectric thereby effected, a voltage pulse is applied between the sandwich cathode and the anode. The electrons are accelerated in the direction of the anode as a result, and the discharge therefore ignited.

BRIEF DESCRIPTION OF THE DRAWINGS

The invention is explained in more detail below with the aid of a few exemplary embodiments. In the drawing.

DESCRIPTION OF THE PREFERRED EMBODIMENTS

Figure 1A:
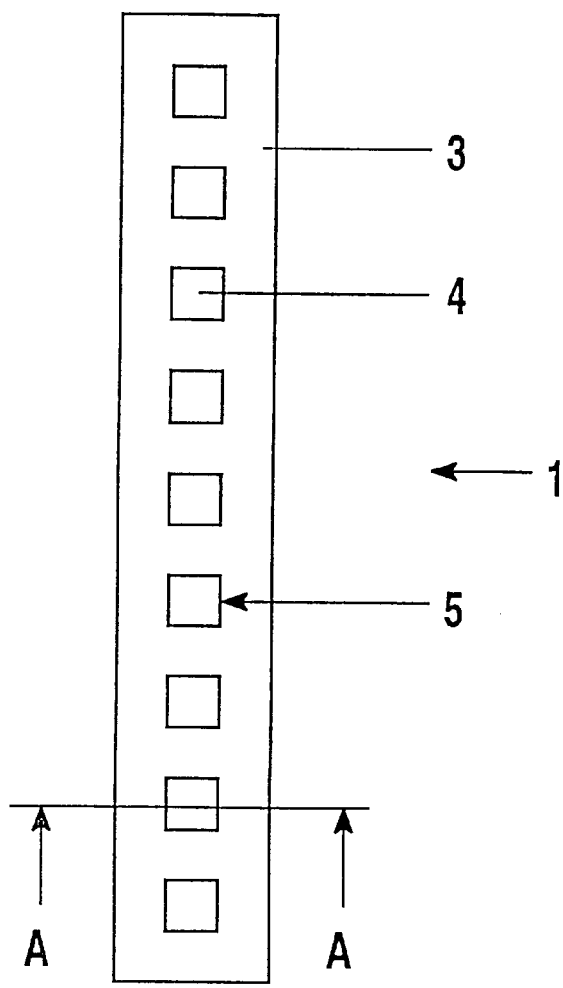
FIG. 1a shows the top view of a strip-shaped cold cathode according to the invention, having a ferroelectric electron emitter, of sandwich design.
Figure 1B:
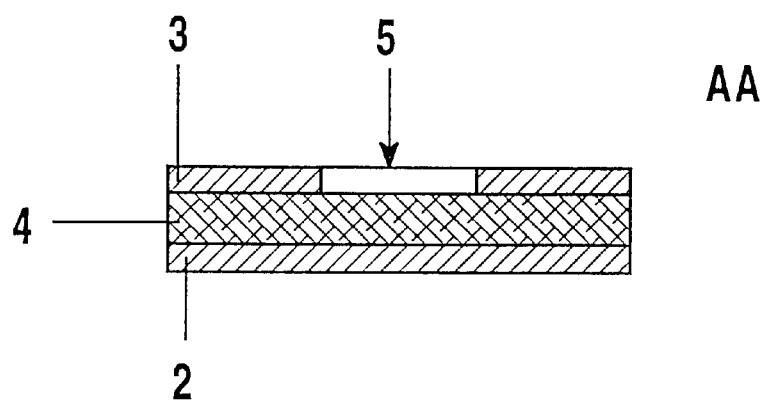
FIG. 1b shows the cross-section along the line AA of the sandwich cathode of FIG. 1a, FIG. 2a shows the top view of an UV/VUV flat radiator having the strip-shaped sandwich cathode of FIG. 1.

FIGS. 1a, 1b respectively show diagrammatically a strip-shaped sandwich cathode 1 in top view and in a cross-section along the line AA. The approximately 2 mm thick sandwich cathode 1 comprises a bottom layer 2, a top layer 3 and a ferroelectric layer 4 arranged between the bottom and top layers. The ferroelectric layer 4 comprises an approximately 100 $\mu$m thick substrate made from PZT (lead zirconium titanate). The bottom layer 2 and top layer 3 consist of platinum, which has been applied to the top side and underside of the ferroelectric substrate 4 with a layer thickness of approximately 1 $\mu$m in each case. At regular spacings of approximately 200 $\mu$m, the top layer 3 has square openings 5 of dimensions 200·200 $\mu m^2$. The bottom layer 2 and top layer 3 are each connected to a lead-in wire (not represented) in order to operate in a discharge lamp. In order for the sandwich cathode 1 to emit electrons from its openings 5, the two lead-in wires are connected to a voltage source (not represent ed) which supplies a voltage signal with rapid polarity reversals.

Figure 2A:
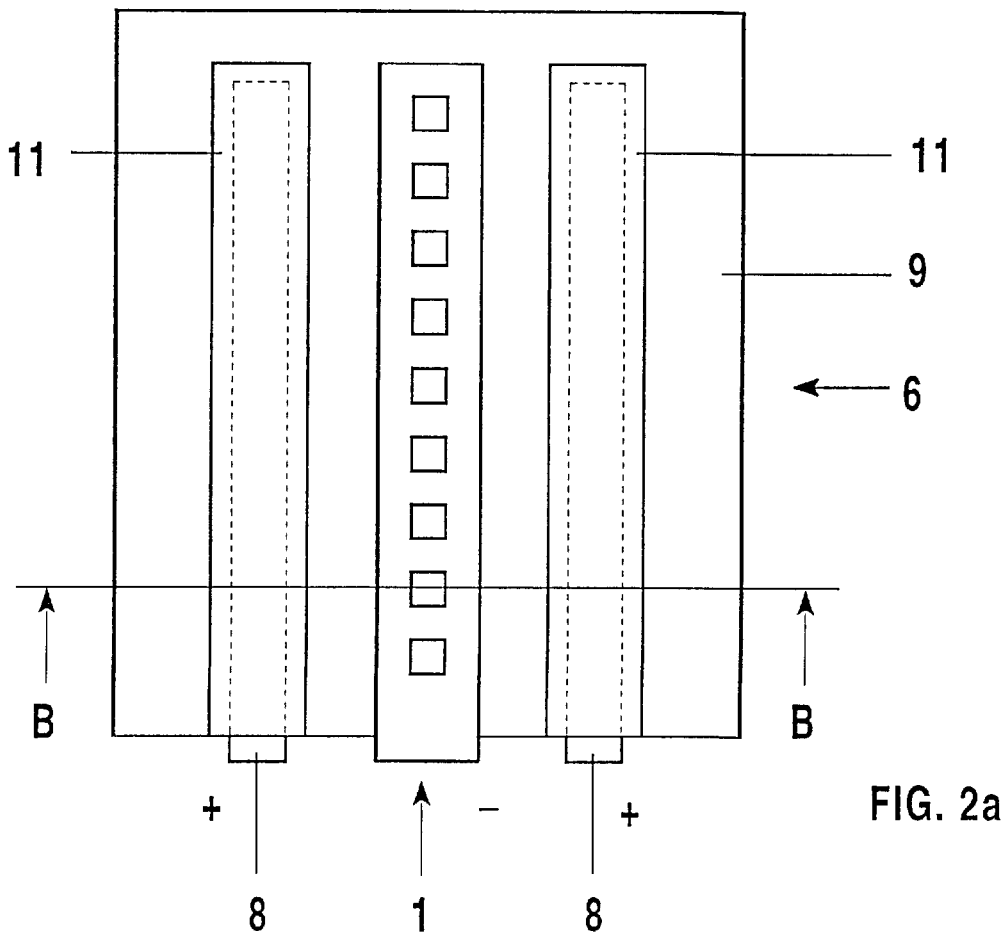
FIG. 2b shows the cross-section along the line BB of the UV/VUV flat radiator of FIG. 2b.
Figure 2B:
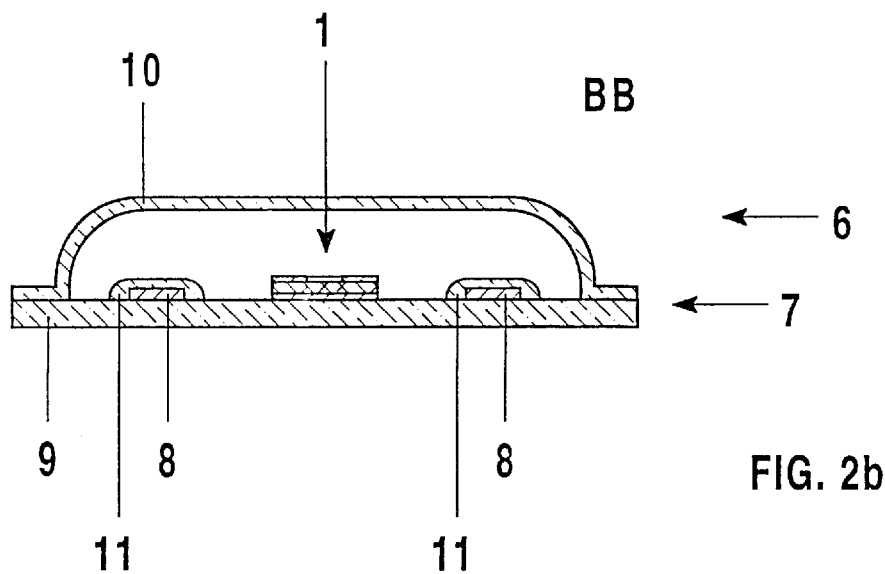

FIGS. 2a, 2b respectively show in a diagrammatic representation a top view and the cross-section along the line BB of an UV/VUV flat radiator 6, that is to say a flat discharge lamp, which is designed for the efficient radiation of UV or VUV radiation. The flat radiator 6 comprises a flat discharge vessel 7 having a rectangular base area, a strip-shaped sandwich cathode 1 in accordance with FIG. 1, and two strip-shaped metal anodes 8. The discharge vessel 7 comprises, for its part, a rectangular baseplate 9 and a trough-type cover 10 (not represented in FIG. 2a), both made from glass. The baseplate 9 and the cover 10 are connected to one another in a gastight fashion in the region of their circumferential edges, and thus enclose the filling gas of the flat radiator 6. The filling gas consists of xenon at a filling pressure of 10 kPa. The anodes 8 are of the same width and, like the sandwich cathode 1, are applied parallel to one another on the inner wall of the baseplate 9. By contrast with the sandwich cathode 1, the two anodes 8 are completely covered by a glass layer 11, the thickness of which is approximately 150 $\mu$m.

In one variant (not represented), the inner wall of the cover 10 is coated with a fluorescent material or a mixture of fluorescent materials, which converts into visible light the UV/VUV radiation generated by the discharge. This variant is a flat fluorescent lamp which is suitable for general lighting or background lighting of displays, for example LCD (Liquid Crystal Display).

Figure 3:
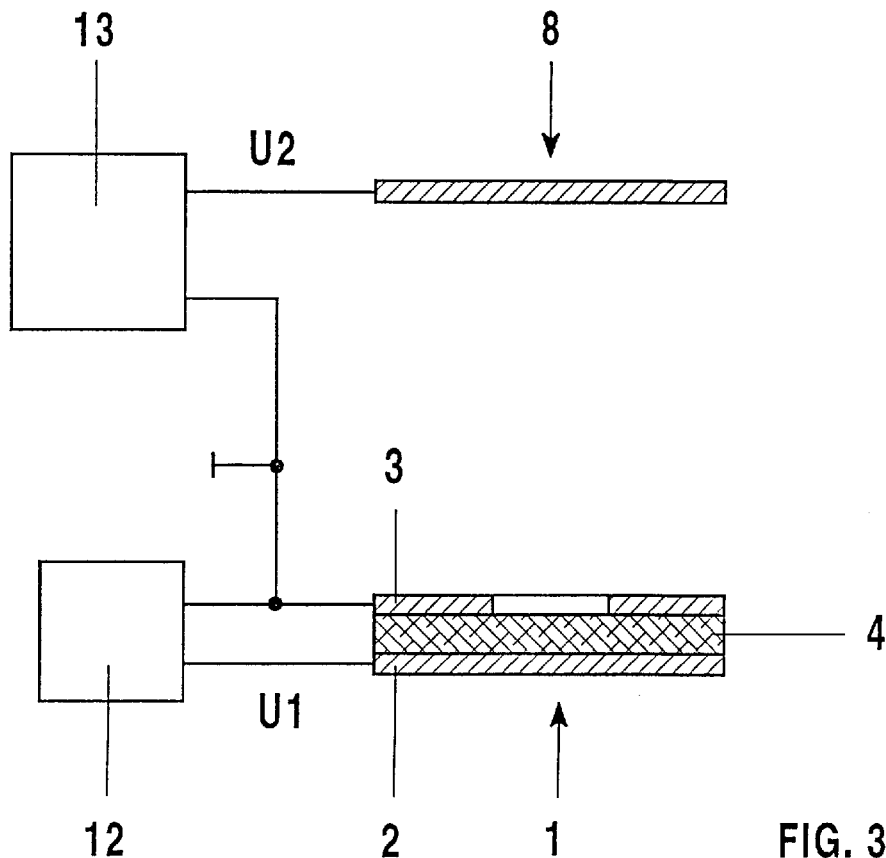
FIG. 3 shows a representation of the principle of the electric circuit of the electrode arrangement of FIG. 2.

In order to explain the method for operating discharge lamps having a sandwich cathode, the arrangement of FIG. 2 and its electric circuit are represented diagrammatically in FIG. 3. In this case, the same reference numerals denote the same features. The electrodes of the sandwich cathode 1, specifically the bottom layer 2 and the top layer 3, are connected in each case to an output pole of a first voltage source 12 which supplies a voltage signal $U_1$. The anode 8 (only an anode strip is shown in cross-section, for the sake of simplicity) is connected to a first pole of a second voltage source 13, which supplies a voltage signal $U_2$. Furthermore, the top layer 3 of the sandwich cathode 1 is additionally connected to the second pole of the second voltage source 13.

Figure 4A:
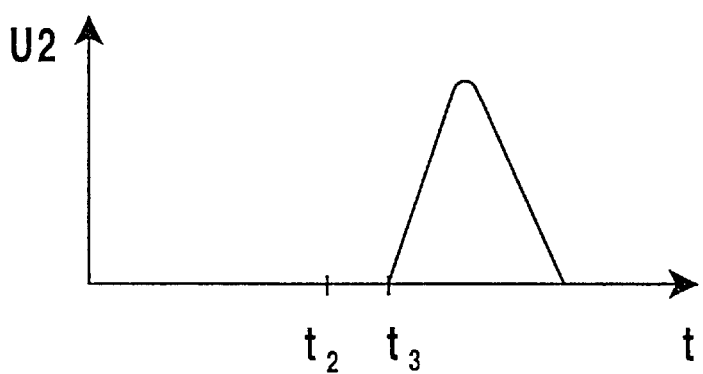
FIG. 4a shows an excerpt from the time characteristic of the voltage at the lamp electrodes in the case of a pulsed mode of operation.
Figure 4B:
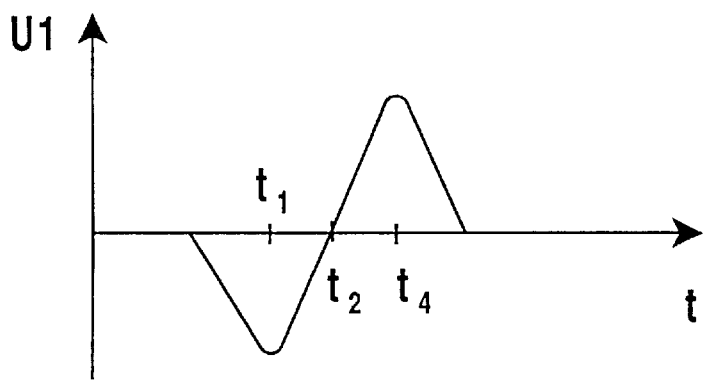
FIG. 4b shows the time characteristic, belonging to FIG. 4a, of the voltage at the sandwich cathode in accordance with the method of operation according to the invention.

FIGS. 4a and 4b likewise serve to explain the principle of the method of operation, according to the invention with reference to the example of a discharge operated in pulses. These show in each case the time characteristic of the two voltage signals $U_1$ and $U_2$ mentioned in FIG. 3. Only one voltage pulse of a sequence of voltage pulses which is unlimited in principle is shown in each case. The temporal synchronization of the two voltage signals $U_1$ and $U_2$, inter alia, is essential. The first voltage signal $U_1$ is selected such that it rapidly reverses the polarity at an instant $t_2$, and thus starts the release of electrons from the ferroelectric layer 4. Thereafter, that is to say at a later instant $t_3 > t_2$, a voltage pulse of the voltage signal $U_2$ is specifically started, which accelerates the released electrons in the direction of the anode 8 and thereby ignites or maintains the discharge. The period for the polarity reversal of the voltage signal $U_1$—calculated here as the temporal spacing $\Delta = t_4 - t_1$ between the peaks of two voltage pulses of different polarity which follow one another at the instances $t_1$ and $t_4$—is approximately 500 ns and less. Typical values are of the order of magnitude of 100 ns or a few 100 ns.

What is claimed is:

1. A discharge lamp comprising:

at least one anode and a cold cathode in an at least partially transparent discharge vessel, the cold cathode having a ferroelectric between two electrodes, a first one of the two electrodes having openings for releasing electrons;

means for releasing electrons through the openings on the first electrode by applying a first time-variant voltage signal with polarity reversals to the two electrodes of the cold cathode;

means for accelerating the released electrons by applying a second time-variant voltage signal to the at least one anode and to the first electrode of the cold cathode; and means for synchronizing the first and second signals so that each polarity reversal of the first signal in a first direction is followed by an increase in an absolute value of an amplitude of the second signal.

2. The lamp of claim 1, wherein the period for the polarity reversal of the first signal is no more than 500 ns.

3. The lamp of claim 1, wherein the second signal includes voltage pulses separated by off periods.

4. The lamp of claim 1, wherein the voltage pulses have a pulse width of 0.1 $\mu$s to 10 $\mu$s.

5. The lamp of claim 1, wherein a pulse repetition frequency of the voltage pulses is between 1 kHz and 1 MHz.

6. The lamp of claim 1, wherein the second time-variant voltage signal comprises an AC voltage.

* * * * *